(12) United States Patent
Reulman, Sr.

(10) Patent No.: US 10,170,878 B1
(45) Date of Patent: Jan. 1, 2019

(54) JUNCTION BOX WITH AN INTEGRATED CONNECTION CIRCUIT

(71) Applicant: David Mark Reulman, Sr., Bermuda Dunes, CA (US)

(72) Inventor: David Mark Reulman, Sr., Bermuda Dunes, CA (US)

( * ) Notice: Subject to any disclaimer, the term of this patent is extended or adjusted under 35 U.S.C. 154(b) by 0 days.

(21) Appl. No.: 15/862,583

(22) Filed: Jan. 4, 2018

Related U.S. Application Data

(60) Provisional application No. 62/547,969, filed on Aug. 21, 2017.

(51) Int. Cl.
| | |
|---|---|
| *H01R 4/2483* | (2018.01) |
| *H01R 24/76* | (2011.01) |
| *H01R 25/00* | (2006.01) |
| *H02G 3/12* | (2006.01) |
| *H02G 3/16* | (2006.01) |
| *H01R 9/24* | (2006.01) |
| *H02G 3/08* | (2006.01) |
| *H01R 13/70* | (2006.01) |
| *H01R 103/00* | (2006.01) |
| *H01R 13/514* | (2006.01) |

(52) U.S. Cl.
CPC .......... *H01R 24/76* (2013.01); *H01R 9/2408* (2013.01); *H01R 25/006* (2013.01); *H02G 3/086* (2013.01); *H02G 3/121* (2013.01); *H02G 3/16* (2013.01); *H01R 4/2483* (2013.01); *H01R 13/514* (2013.01); *H01R 13/70* (2013.01); *H01R 2103/00* (2013.01)

(58) Field of Classification Search
CPC ....... H01R 24/76; H01R 25/006; H01R 13/70
USPC .......................................................... 439/535
See application file for complete search history.

(56) References Cited

U.S. PATENT DOCUMENTS

| | | | | | |
|---|---|---|---|---|---|
| 2,410,287 | A | * | 10/1946 | Jaberg .................... | H01R 24/76 174/53 |
| 2,433,917 | A | * | 1/1948 | McCartney .......... | H01R 25/006 174/50 |
| 2,920,303 | A | * | 1/1960 | Johnson ............... | H01R 4/2483 174/53 |
| 3,609,647 | A | * | 9/1971 | Castellano ........... | H01R 25/006 174/53 |
| 3,716,651 | A | * | 2/1973 | Werner ................ | H01R 25/006 174/53 |
| 3,922,478 | A | * | 11/1975 | Perkey .................. | H01R 24/76 174/53 |

(Continued)

*Primary Examiner* — Alexander Gilman
(74) *Attorney, Agent, or Firm* — Kirk A. Buhler; Buhler & Associates

(57) ABSTRACT

Improvements to an electrical junction box is disclosed. The junction box is configured with integrated connections in the back of the junction box. Switches and outlets have tabs in specific locations that align with the desired integrated connections to provide the desired function. All of the outlets and switches align parallel with the back and front of the junction box. The junction box is configurable to accept a single switch, dimmer switch, 3-way or outlet to many more than one function. In addition, the function of a junction box can be easily changed as long as the wiring has been connected to the new junction box. Installation and changes can be made in seconds instead of minutes. The depth of the internal distribution receptacle is adjustable within the adjustable electrical box to accommodate the thickness of the outlet or switch.

12 Claims, 9 Drawing Sheets

(56) References Cited

U.S. PATENT DOCUMENTS

Figure 3:
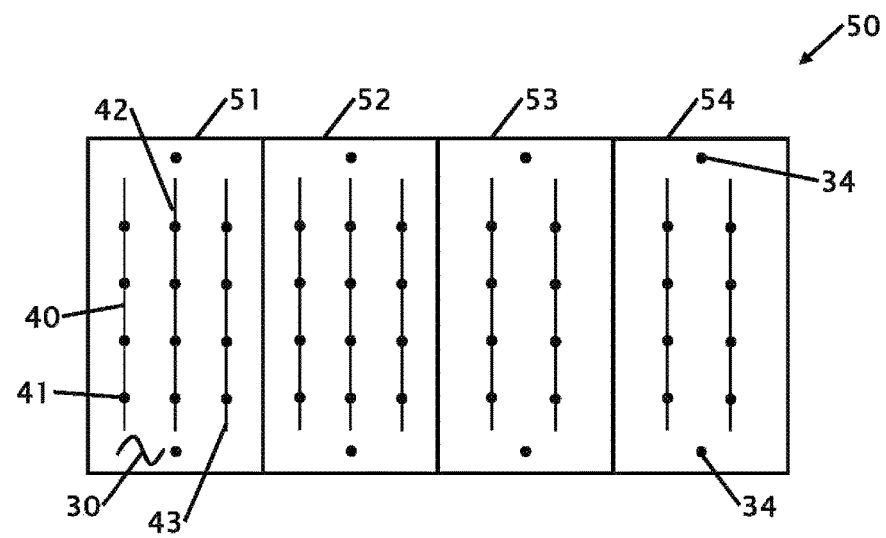

| Patent No. | | Date | Inventor | Classification |
|---|---|---|---|---|
| 3,927,402 | A * | 12/1975 | Thompson | A63J 17/00 340/815.45 |
| 4,103,125 | A * | 7/1978 | Marrero | H01R 24/76 200/51 R |
| 4,165,443 | A * | 8/1979 | Figart | H02G 3/16 174/53 |
| 4,924,032 | A * | 5/1990 | Akins | H02G 3/00 174/53 |
| 4,958,048 | A * | 9/1990 | Bell | H02G 3/125 174/53 |
| 5,399,806 | A * | 3/1995 | Olson | H01R 13/518 174/53 |
| 5,471,012 | A * | 11/1995 | Opel | H02G 3/16 174/53 |
| 5,525,754 | A * | 6/1996 | Akins | H01R 4/4827 174/53 |
| 5,877,944 | A * | 3/1999 | Onizuka | H01H 85/20 361/644 |
| 6,201,187 | B1 * | 3/2001 | Burbine | H01R 13/465 174/53 |
| 6,341,981 | B1 * | 1/2002 | Gorman | H01R 13/652 174/53 |
| 6,786,766 | B1 * | 9/2004 | Chopra | H01R 4/4827 439/441 |
| 6,843,680 | B2 * | 1/2005 | Gorman | H01R 4/44 439/535 |
| 6,953,894 | B2 * | 10/2005 | Ungerman | H02G 3/086 174/502 |
| 7,034,222 | B1 * | 4/2006 | York | H02G 3/16 174/50 |
| 7,034,422 | B2 * | 4/2006 | Ramu | H02K 1/246 310/112 |
| 7,160,147 | B1 * | 1/2007 | Stephan | H01R 9/24 174/60 |
| 7,312,396 | B1 * | 12/2007 | Gorman | H02G 3/125 174/480 |
| 7,425,677 | B2 * | 9/2008 | Gates | H01R 13/508 174/481 |
| 7,569,771 | B2 * | 8/2009 | Nicholson | H01R 31/06 174/481 |
| 7,572,976 | B1 * | 8/2009 | Merrill | H01R 9/2408 174/17 R |
| 7,666,010 | B2 * | 2/2010 | Arenas | H01R 9/2491 439/107 |
| 7,767,905 | B2 * | 8/2010 | Meyer | H02G 3/123 174/135 |
| 7,955,096 | B2 * | 6/2011 | Arenas | H01R 9/2491 439/107 |
| 8,109,785 | B2 * | 2/2012 | Kidman | H01R 13/506 439/535 |
| 9,196,432 | B1 * | 11/2015 | O'Keeffe | H04W 4/21 |
| 9,325,162 | B2 * | 4/2016 | Moss | H02G 3/14 |
| 9,406,456 | B2 | 8/2016 | O'Keeffe | |
| 9,437,978 | B2 * | 9/2016 | Green | H01R 13/652 |
| 9,728,947 | B2 * | 8/2017 | Trojanowski | H02G 3/14 |
| 9,960,580 | B1 * | 5/2018 | Ruggiero | H02G 3/081 |
| 9,991,636 | B2 * | 6/2018 | Derousse | H01R 13/6395 |
| 2002/0185296 | A1 * | 12/2002 | Schultz | H01R 24/70 174/53 |
| 2006/0161270 | A1 * | 7/2006 | Luskin | G05B 15/02 700/22 |
| 2009/0239422 | A1 * | 9/2009 | Fukazawa | H01R 12/716 439/660 |

\* cited by examiner

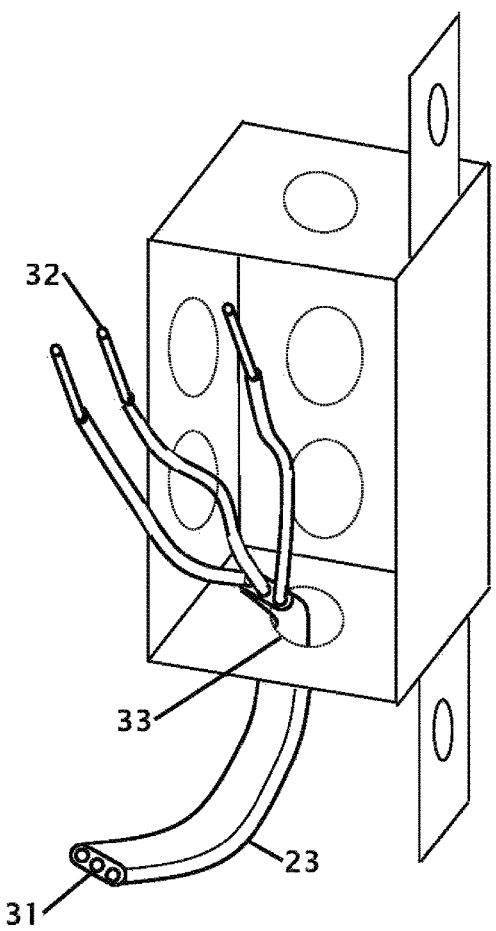
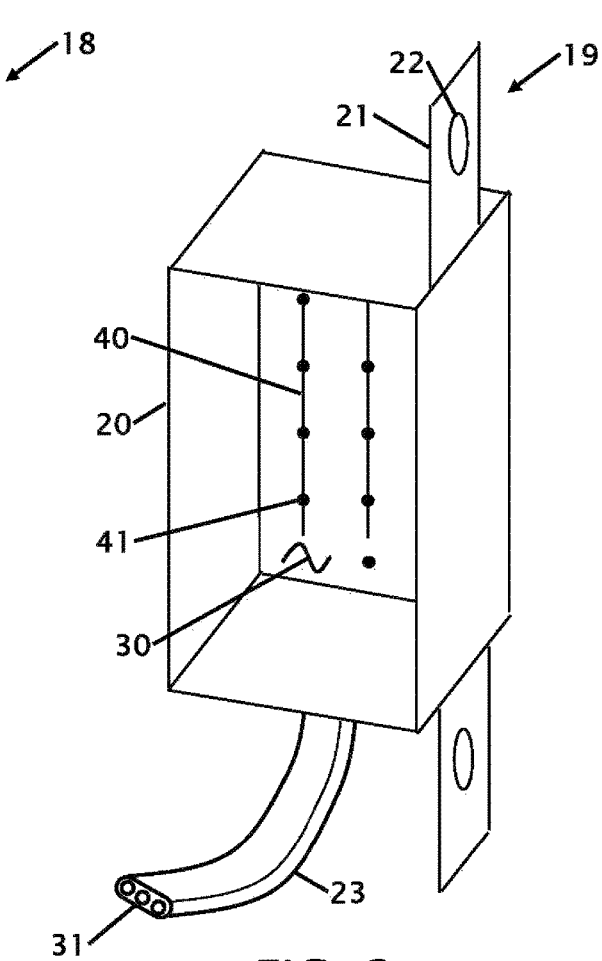
FIG. 1
Prior Art
FIG. 2

US 10,170,878 B1

JUNCTION BOX WITH AN INTEGRATED CONNECTION CIRCUIT

CROSS REFERENCE TO RELATED APPLICATIONS

This application is a continuation-in-part of applicant's application Ser. No. 62/547,969 filed Aug. 21, 2017 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in an electrical junction box. More particularly, the present junction box is for 110-volt electrical junction boxes, light switches, duplex outlets and trim plates with an integrated connection circuit that allows an installer to install electrical outlets, switches and a variety of other common electrical control devices into an electrical junction box without securing a free wire to an electrical device or requiring joining of individual, or collective wires, with a twist on wire connector.

Description of Related Art including information disclosed under 37 CFR 1.97 and 1.98.

When houses are constructed, electrical wires are pulled from the breaker box to each electrical box and the jacketed wire in placed, wound or wrapped in a plurality of electrical junction boxes. After the drywall or sheet rock has been secured to the wall, the wall has been textured and painted, an electrician pulls the wire jacket from the junction box. The conductors from the jacketed wires are separates, stripped and connected to, usually a switch or an electrical outlet according to the blueprints for the house. The electrician will then continue throughout the house following the same general process. This process has remained essentially unchanged for the many years. The process is both tedious, time consuming and requires an electrician to make wiring changes.

Home automation has made attempts to provide additional control over the lighting and wiring of a home. Home automation typically requires the additional installation of communication wires and/or wireless control transmitters and/or receivers. While home automation provides some additional benefits, it essentially still relies upon an installer to manually connect wires by twisting two or more wires together or securing loose wires to an outlet or switch.

A number of patents and or publications have been made to address these issues. Exemplary examples of patents and or publication that try to address this/these problem(s) are identified and discussed below.

U.S. Pat. No. 2,433,917 issued on Jan. 6, 1948 to W. J. McCartney and is titled Outlet Box and Plug in Connections Therefor. This patent discloses a junction box with a socket for installing a switch into the socket. The patent does not utilize a circuit, it simply has two connections for installing or replacing the switch.

U.S. Pat. No. 3,922,478 issued on Nov. 25, 1975 to Preston R. Perkey and is titled Utility Structure Usable as Electrical Wiring Equipment. This patent discloses a series of grooved conductors where the switch or outlet connect. It does not provide a configurable circuit for connection different functional devices.

U.S. Pat. No. 7,034,222 issued on Apr. 25, 2006 to Roy Wayne York and is titled Electrical Junction System. This patent discloses an electrical junction system includes a junction box that is attached to a wall stud or other structure and electrical power is routed to the box. The electrical wires are connected into the back of the junction box and there are contact pads for connection to the outlet. This provides only one use for the box as opposed to a universal junction box.

What is needed is a junction box with an integrated connection circuit. This disclosure provides a solution where each junction box is pre-wired with all wiring combinations. It allows an installer to simply insert the switch, outlet or other device into the junction box and eliminated manual twisting of electrical wires.

BRIEF SUMMARY OF THE INVENTION

It is an object of the junction box with an integrated connection circuit to eliminate field wiring by an electrician. This will no longer require an electrician to strip wires, and screw the stripped wired into outlets or switches. This also eliminates the extra length of wire that is folded and packed into the electrical outlet box. The folded, wrapped or bunched wire is often difficult to place in the junction box and can cause switches and outlets to be tipped and not flat within the junction box. This tipping is eliminated because each switch or outlet sits flush against the back of the junction box.

It is an object of the junction box with an integrated connection circuit to be configured to accept one or more switch or outlet. The new junction box can be fabricated to accept from one to four or more switches or outlets. It is also contemplated to configure the new junction box as a base where an installer can connect sides to the base to make a box from a single outlet. The base can be used with a single side, and multiple bases can be serially connected to allow for as many switches or outlets that are desired. After the desired number of bases are connected an end cap is used to enclose the open end.

It is another object of the junction box with an integrated connection circuit to accept any common electrical device such as, but not limited to a switch, an outlet, a three-way switch, a dimmer and others. A junction box with a simple switch can be updated to a dimmer, by simple removing the switch and installing a dimmer. This is all accomplished without stripping wires, twist-on wire connectors or unscrewing/screwing wires to the side of the switch. An installer can also replace a switch in a single position junction box to a switch and outlet combination.

It is another object of the junction box with an integrated connection circuit to utilize proprietary light switches, duplex outlets and trim plates. The proprietary pieces allow for a smaller height, width and depth of the electrical junction box. This allows for new architectural options in the design of a house or for upgrades to an existing house with 110-volt electrical control and supply connections.

It is another object of the junction box for the depth of the internal distribution receptacle to be adjustable within the adjustable electrical box to accommodate the thickness of the outlet or switch.

It is still another object of the junction box with an integrated connection circuit to eliminate the time-consuming labor for the installation. Instead of minutes to install an outlet or switch, an installer can set or replace a switch or outlet in seconds. Because all of the components have a standard configuration and alignment, the potential for a short or open circuit is virtually eliminated.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 5:
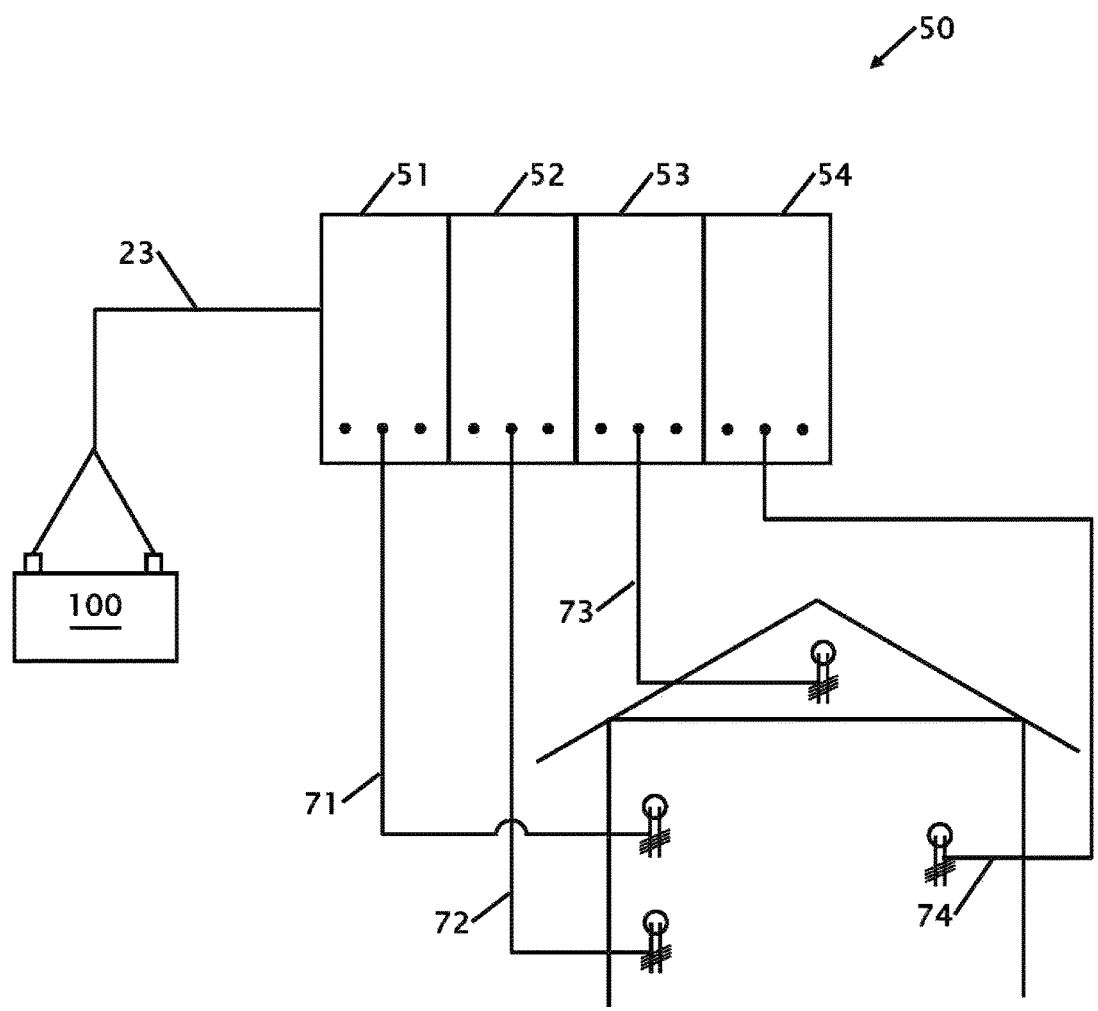
Figure 6:
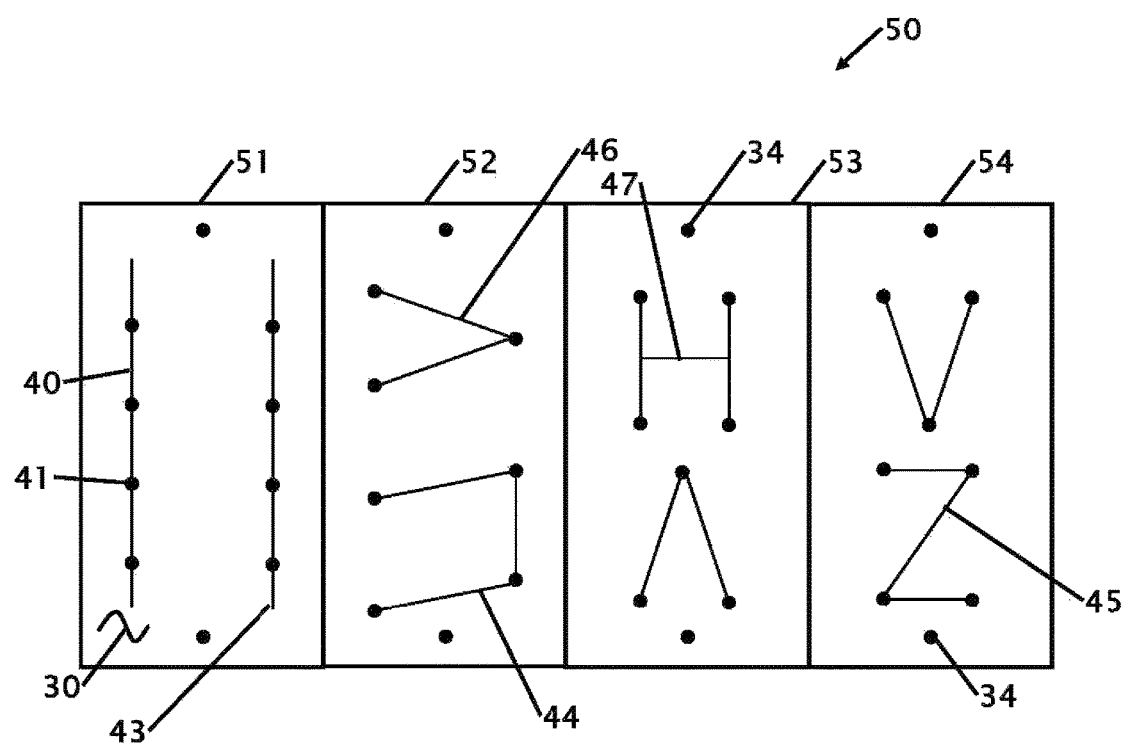
Figure 7A:
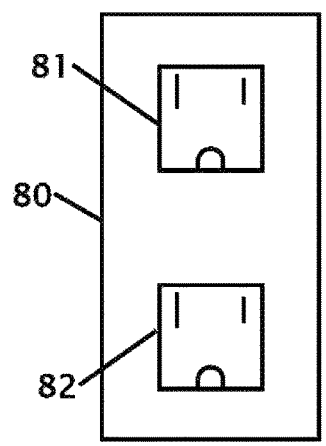
Figure 7B:
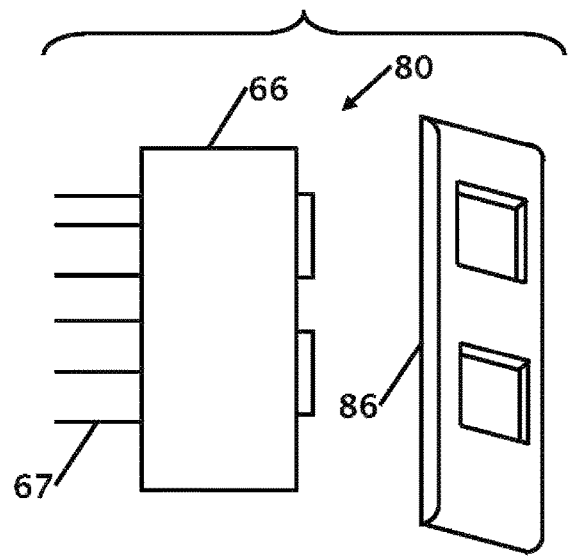
Figure 7C:
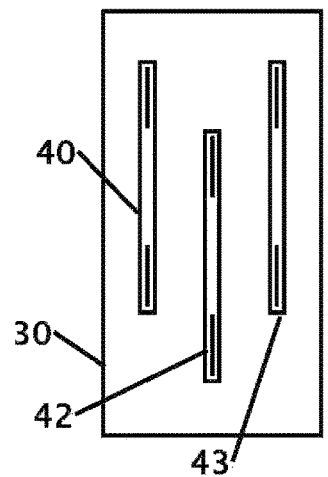
Figure 8:
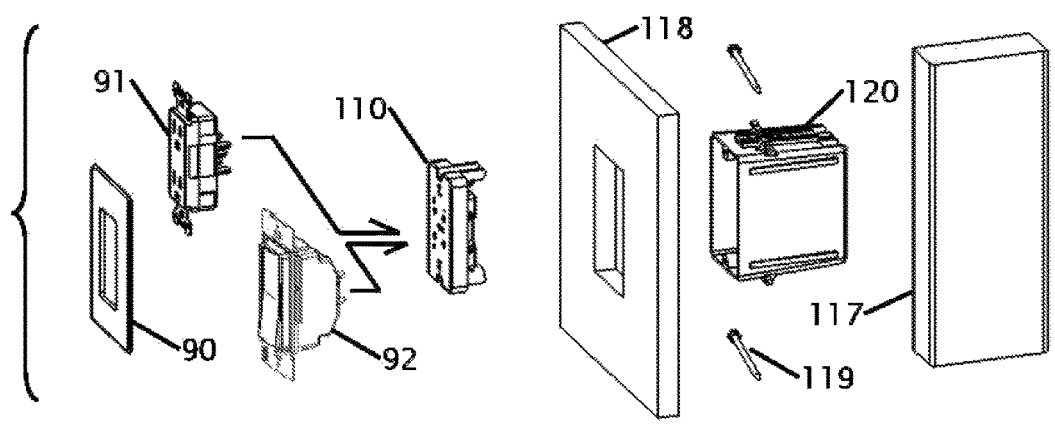
Figures 9A, 9B:
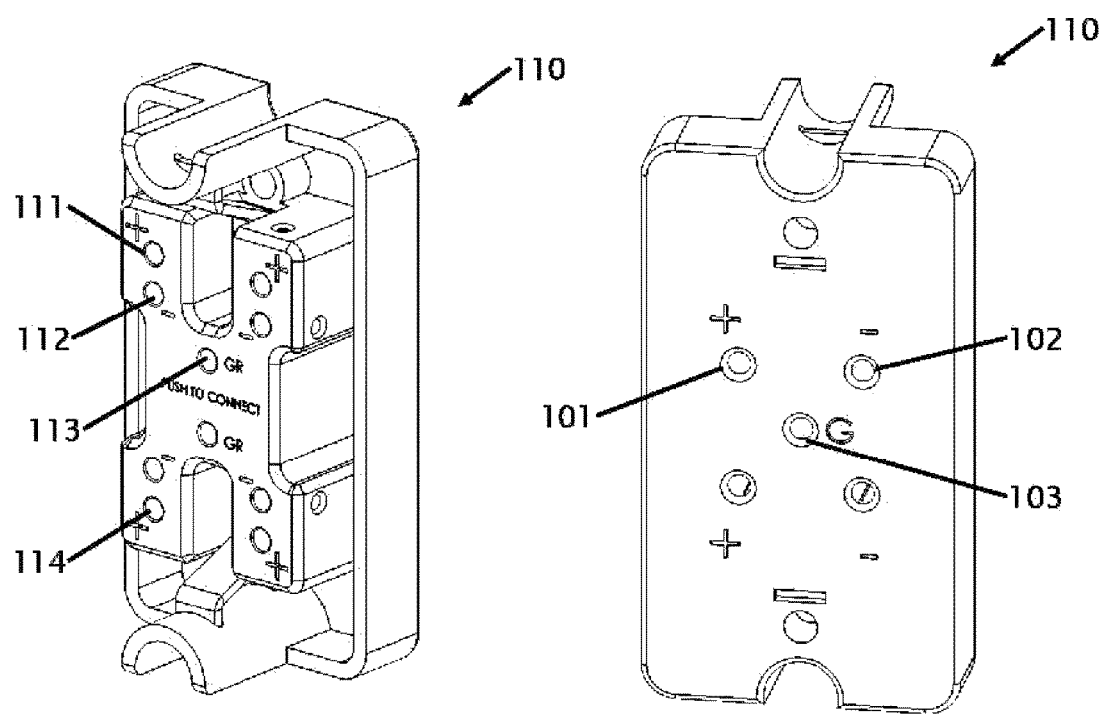
Figures 10A, 10B:
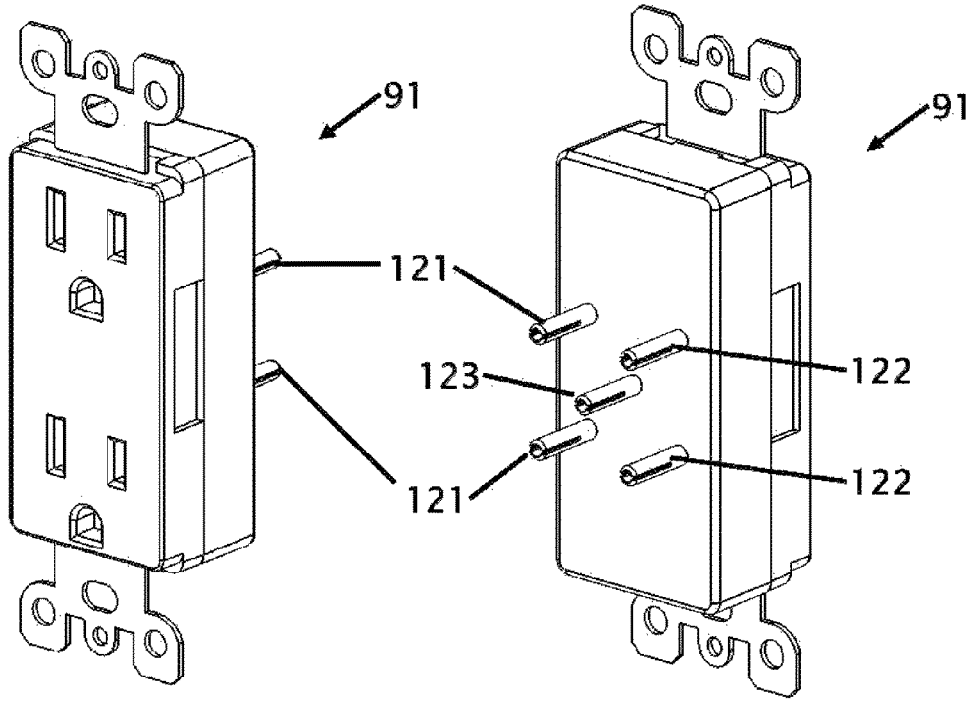
Figures 11A, 11B:
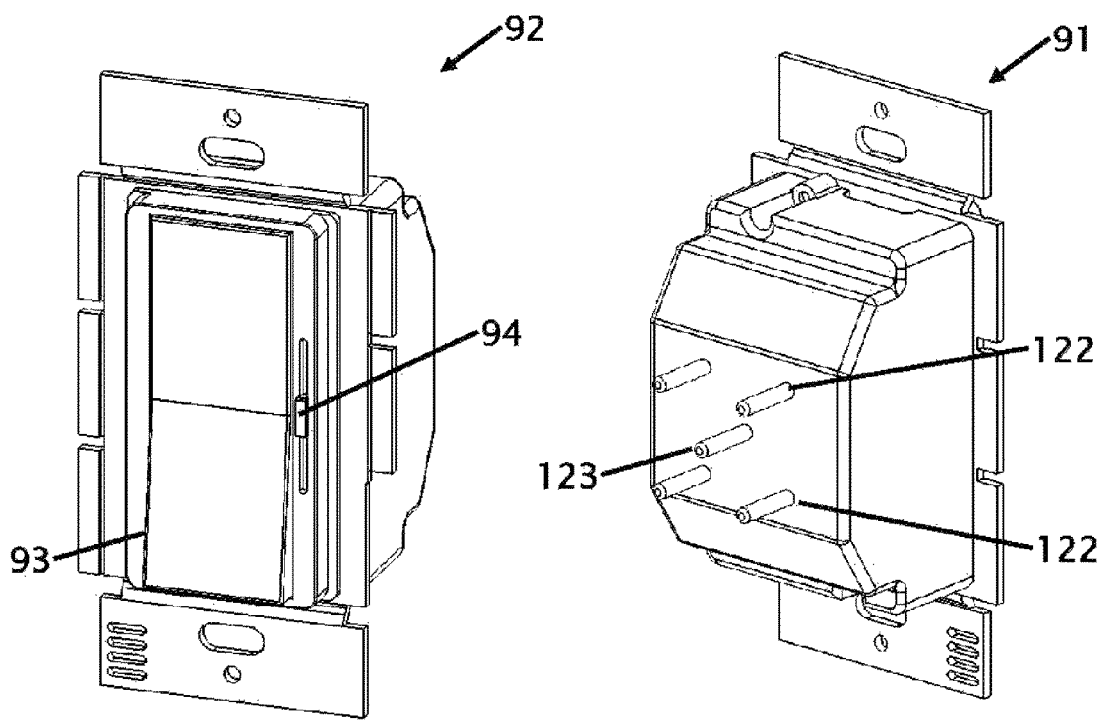
Figure 12:
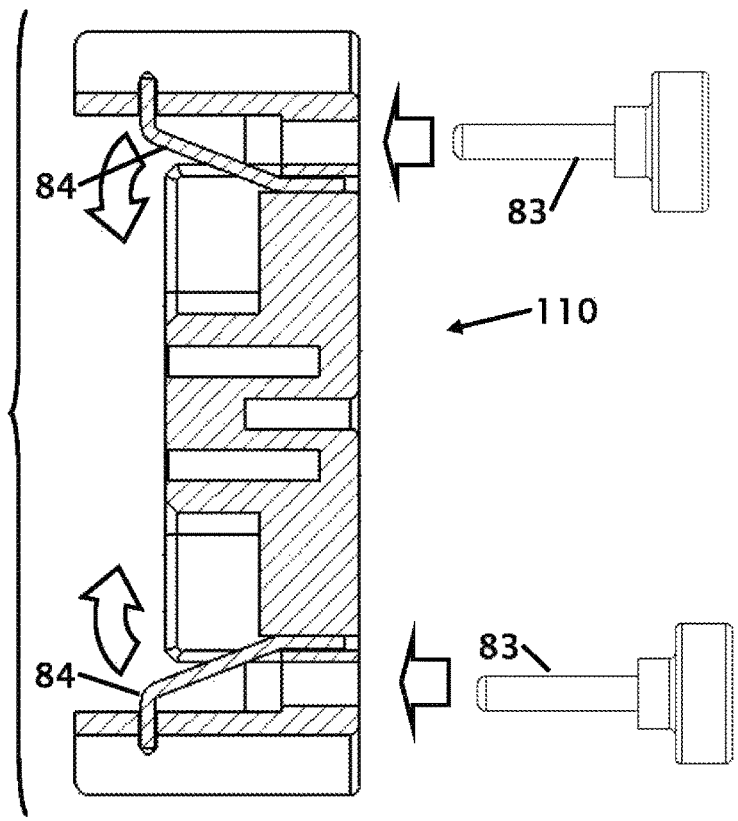
Figure 13:
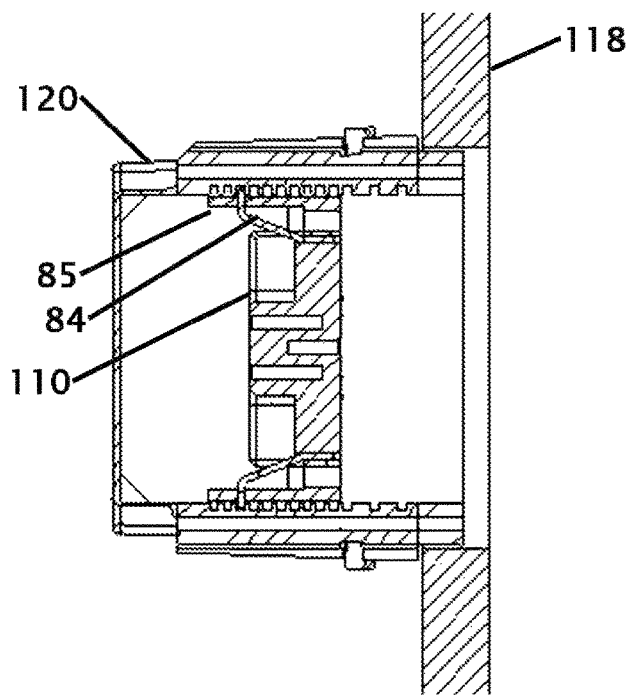
Figure 14:
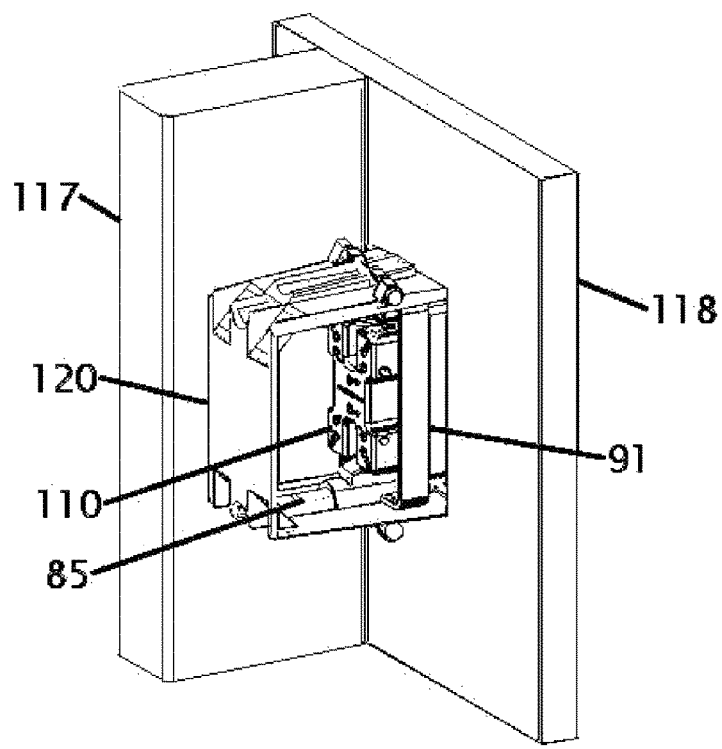
Figure 15:
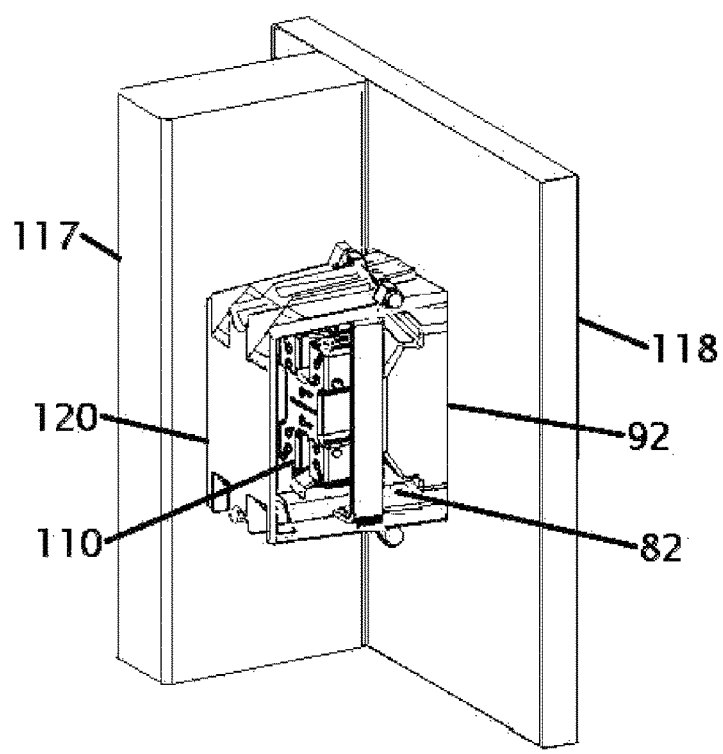

FIG. 1 shows a prior art junction box with wiring.
FIG. 2 shows a junction box with an integrated connection circuit.
FIG. 3 a circuit board with multiple gangs.
FIG. 4A-4D shows different switch configurations.
FIG. 5 shows a house wiring with the junction box with an integrated connection circuit.
FIG. 6 shows some contemplated inserts for electrical boxes.
FIG. 7A-7C shows the components used with a duplex outlet.
FIG. 8 shows an exploded view of a junction box with intermediary connector with optional switch or outlet.
FIG. 9A is a rear view of an integrated connection circuit
FIG. 9B is a front view of the integrated connection circuit.
FIG. 10A is a rear view of a duplex receptacle.
FIG. 10B is a front view of the duplex receptacle.
FIG. 11A is a rear view of a rocker dimmer switch.
FIG. 11B is a front view of the rocker dimmer switch.
FIG. 12 is a cross-sectional view of the distribution receptacle.
FIG. 13 is a cross-sectional view of the depth adjustable distribution receptacle.
FIG. 14 shows an installed depth adjustable distribution receptacle with a duplex receptacle.
FIG. 15 shows an installed depth adjustable distribution receptacle with a rocker dimmer switch.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

ITEM NUMBERS AND DESCRIPTION 18 junction box (Prior Art)
19 junction box
20 junction box sides
21 tab(s)
22 hole
23 jacketed wire
30 circuit board
31 conductor
32 wire
33 hole
34 threaded hole
40 trace
41 contact
42 contact
43 contact
44 connections
45 connections
46 connections
47 connections
50 multi-gang box
51 1 gang
52 2 gang
53 3 gang
54 4 gang
60 Dimmer
61 3-way
62 2-way
63 switch
65 front plate
66 body
67 terminal
68 control
71 connection wiring
72 connection wiring
73 connection wiring
74 connection wiring
80 duplex outlet
81 outlet
82 outlet
83 depth adjustment tool
84 spring
85 rack
86 cover plate
91 duplex receptacle
92 rocker dimmer switch
93 switch
94 slider, dimmer
100 power connection
101 positive outputs
102 neutral outputs
103 ground outputs
110 internal distribution receptacle
111 positive inputs
112 neutral inputs
113 ground inputs
114 positive inputs
117 wall stud
118 wall panel
119 nails
120 adjustable electrical box
121 positive pin
122 neutral pin
123 ground pin FIG. 1 shows a prior art junction box 18 with wiring. This is a typical rough wiring to a junction box 18. The junction box 18 is basically formed from bent sheet metal or from molded plastic. The junction box 18 is secured to a wall stud and jacket wire 23 is placed through a hole 33 into the junction box 18. The jacket of the wire 23 typically has three conductors 31, but can have four conductors for three-way switches or switched circuits. The jacket is stripped and the individual wires are stripped to expose the bare wire 32. In the final electrical wiring, the bare wire is either connected to another wire with a twist-on wire connector or is secured to an outlet or switch.

FIG. 2 shows a junction box 19 with an integrated connection circuit 30. In this preferred embodiment, the jacketed wire 23 with the conductors 31 are connected into the junction box 20. The exterior of the junction box 19 is similar to the prior art version. The junction box 19 has side walls 20 with one or more tabs 21 and a hole 22 or other mechanism that allows the junction box 19 to be secured to a stud. While this embodiment shows that the junction box 19 is configured for new construction, it can also be configured for installation in old construction or old work. Further, while the embodiment shown is for a single box, it can be configured for more than one circuit.

The major difference is the connection of the jacket wire 23 to the junction box 19 and the integrated circuit 30. The jacketed wire 23 is stripped and connected to the junction box 19 with screw terminals or pinch terminals that connect the individual conductors 31 of the jacketed wire 23 to the circuit board 30. The conductors 31 make electrical contact to the traces 40 and the contact locations 41. This is shown and described in more detail in the following figures.

FIG. 3 a circuit board with multiple gangs 50. This figure shows an electrical box or circuit that is configured to accept four circuit for 1gang 51, 2gang 52, 3gang 53, and 4gang 54. While a four-gang circuit for a four-gang electrical junction box is shown and described, it should be understood that the junction box can be configured as a single junction box as previously shown and described to any number from one to four or more than four circuits.

The circuit has traces for each of the common 40, ground 42 and neutral 43. The conductors run vertically along the junction box to allow for connection at different locations along the vertical trace. There are also contact locations 41 for connection with switches and outlets. The electrical conductors 40, 42 and 43 are further electrically connected in each gang 51, 52, 53 and 54. This figure shows that some of the gang circuits can have connections for only the common and neutral. The circuit board 30 has holes 34 for threaded inserts that accept and secure the switch or outlet.

Figures 4A, 4B, 4C, 4D:
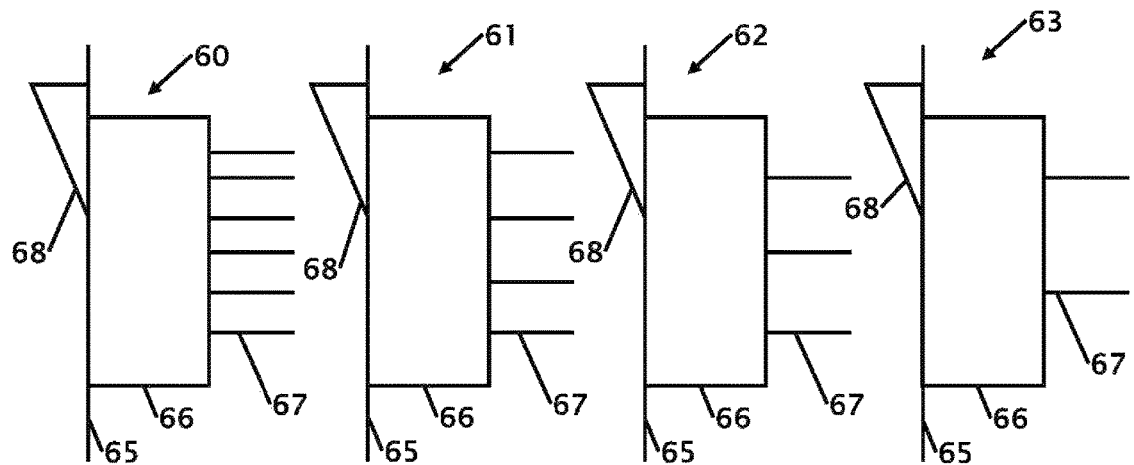

FIG. 4A-4D shows different switch configurations. The versatility of the junction box with an integrated connection circuit allows for connection of a variety of different outlets and controls. The control switches of outlets can be easily changed. In these figures are four control devices that can be installed in any position in the multi-gang box. In FIG. 4A is a dimmer 60, FIG. 4B is a 30-way switch 61, FIG. 4C is a 2-way switch 62 and FIG. 4D is a single pole single throw switch 63.

Each switch housing 66 is configured to fit within the junction box. The housing is essentially a rectangular block with the switching circuit within the housing 66. A front plate 65 is secured to the housing 66. The front plate 65 is configured to fit flush with the front of the junction box. Screws or other fasteners fit through the front plate 65 and secures the switch or an outlet with the holes 34 (shown in other figures). This mounts the control device flush inside of the junction box with the control 68 paddle or knob extending out from the front plate 65. The rear of each switch housing 66 has a plurality of terminals 67 that make electrical contact with the circuit(s) in the circuit board in the back of the junction box.

FIG. 5 shows a house wiring with the junction box with an integrated connection circuit. The house wiring is connected to a power connection 100 from the house with jacketed wiring 23 that are pushed or otherwise secured to the power connection 100. The wiring could also be individual wires that are placed in a conduit where the wiring runs from the incoming power to the back of a gang of junction boxes 50. In this figure, the gang of junction boxes 50 has a gang of four connections 51, 52, 53 and 54.

In this figure, gang 51 is connected 71 to a first outlet or switch, a second gang 52 is connected 72 to a second outlet or switch, a third gang 53 is connected 73 to a third outlet or switch and a fourth gang 54 is connected 74 to a fourth outlet or switch. While a four-gang junction box with connections is shown and described, it should be understood that more or less than a four-gang junction box and connections is contemplated.

FIG. 6 shows some contemplated inserts for electrical boxes. The boxes are preferably made of plastic, but metal or other equivalent materials are contemplated. The circuit and copper or aluminum inserts are configured to accommodate the different connections that are required or designed. In this figure, the four-gang junction box 50 shows each gang 51, 52, 53 and 54 with different wired connections 44, 45, 46 and 47. In the first gang 51 the common 40 and the neutral 43 contacts or circuit connects vertically within the gang on the circuit board 30. In all of the gangs the threaded hole 34 remains at the same location to accommodate mounting of the switch and/or outlet to connect to the contact(s) 41.

FIG. 7A-7C shows the components used with a duplex outlet 80. Because the junction box does not require internal volume to accommodate the wiring the depth, and potentially the height and width, of the junction box can be a smaller footprint. The duplex outlet 80 has two outlets 81 and 82 for connecting one or two electrical devices to the outlets 81 and 82 to supply 110 volts of power. The 110 volts is given as a reference, but higher or lower voltage is also contemplated. The junction box, and traces can be adjusted to handle different power or current requirements.

FIG. 7B shows the side of the body 66 of the duplex outlet. The terminals 67 are shown extending out of the body 66 of the duplex outlet 80. A cover plate 86 or custom cover plate is used to cover the front of the Because internal volume is no longer required to accommodate wires within the junction box the thickness or depth of the body 66 can be significantly reduced to allow for additional insulation or structural building requirements.

In FIG. 7C another contemplated embodiment of the circuit 30 is shown. This embodiment shows the circuit or trace for the common 40, the neutral 43 and the ground 42. Because the use of twist-on wire connectors is not used, a solid connection between the duplex outlet 80 and the house wiring is ensured.

FIG. 8 shows an exploded view of a junction box with intermediary connector with optional switch or outlet. The nails 119 secure the adjustable electrical box 120 onto the wall stud 117. Typically, two nails 119 are used, but the adjustable electrical box can be installed with a clamp onto the wall panel 118. An internal distribution receptacle 110 is wired into a house or building electrical system, and the area behind the internal distribution receptacle 110 allows for the un restrained electrical wiring. The location or depth of the internal distribution receptacle 110 within the adjustable electrical box is adjustable depending upon the installation of a duplex outlet 91 or a rocker dimmer switch 92. A cover plate 90 is secured to the adjustable electrical box to cover openings in the sides of the duplex outlet 91 or a rocker dimmer switch 92. The cover plate 90 can be secured with fasteners or magnets.

FIG. 9A is a rear view of an integrated connection circuit and FIG. 9B is a front view of the integrated connection circuit. The rearview of the internal distribution receptacle 110 has connections for household electrical wires that connect to the positive inputs 111, neutral inputs 112, ground inputs 113 and positive inputs 114. There are two separate positive inputs 111 and 114 for separate circuits for using one outlet as a constantly powered outlet and a switched outlet.

FIG. 10A is a rear view of a duplex receptacle and FIG. 10B is a front view of the duplex receptacle 91. The front of the duplex receptacle 91 has standard three prong openings and the back of the duplex receptacle 91 has pins or posts for positive pin 121, neutral pin 123 and ground pin 123 that connects into the distribution receptacle 110.

FIG. 11A is a rear view of a rocker dimmer switch and FIG. 11B is a front view of the rocker dimmer switch 92. The front of this rocker dimmer switch 92 has a switch 93 and a slider 94 to dim the power out of the switch 93 and the back of the duplex receptacle 91 has pins or posts for positive pin 121, neutral pin 123 and ground pin 123 that connects into the distribution receptacle 110.

FIG. 12 is a cross-sectional view of the distribution receptacle 110. The distribution receptacle 110 has a depth adjustment tool 83. When the depth adjustment tool 83 is inserted into the distribution receptacle 110, the depth adjustment tool lifts or displaces the spring 84. Both springs 84 must be rotated out simultaneously to slide the distribution receptacle 110 in or out of an adjustable electrical box 120. The adjustment is necessary to accommodate the thickness of the outlet 91 or switch 92.

FIG. 13 is a cross-sectional view of the depth adjustable distribution receptacle 120. The internal distribution receptacle 110 is retained at a depth in the adjustable electrical box 120 with springs 84 in independent racks 85. The internal distribution receptacle 110 is shown mounted in a wall panel 118. Each rack 85 has a plurality of slots where the springs 84 engage.

FIG. 14 shows an installed depth adjustable distribution receptacle 110 with a duplex receptacle 91 and FIG. 15 shows an installed depth adjustable distribution receptacle 110 with a rocker dimmer switch 92 at a different depth of the adjustable distribution receptacle 110 at a different depth. These different figures show the embodiments on a wall panel 118 with wall studs 117.

Thus, specific embodiments of a junction box with an integrated connection circuit have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A junction box with an integrated connection circuit comprising:
a junction box configured to accept external wiring with a common, neutral and a ground;
said junction box is an adjustable electrical box;
said junction box connects said external wiring to an internal circuit;
said internal circuit is an internal distribution receptacle;
said internal distribution receptacle is positionable within said adjustable electrical box to provide spacing for said external wiring within said adjustable electrical box and behind said internal distribution receptacle;
said adjustable electrical box has two independent racks integrated into opposing sides of said adjustable electrical box;
said internal distribution receptacle has two independent springs that are configured to engage into said two independent racks whereby said internal distribution receptacle is prevented from moving further into or out of said adjustable electrical box;
said junction box having at least two mechanical securing locations that are configured to secure a user interface device to said junction box;
said user interface device is a switch or an outlet, and said user interface device electrically connects to at least said common and said neutral.

2. The junction box with an integrated connection circuit according to claim 1, wherein each of said two independent racks include a plurality of slots in said opposing sides of said adjustable electrical box.

3. The junction box with an integrated connection circuit according to claim 2, wherein said two independent springs engage in at least one slot in each of said two independent racks.

4. The junction box with an integrated connection circuit according to claim 3, wherein both of said two independent springs must be displaced to clear said two independent racks to set said internal distribution receptacle within said adjustable electrical box.

5. The junction box with an integrated connection circuit according to claim 4, wherein displacing said independent springs is with insertion of a tool through said internal distribution receptacle to bend one of said two independent springs out of said slots.

6. The junction box with an integrated connection circuit according to claim 5, wherein bending said two independent springs allows said internal distribution receptacle to slide within in and out of said adjustable electrical box.

7. The junction box with an integrated connection circuit according to claim 6, wherein said sliding accommodated different thickness said switch or outlet.

8. The junction box with an integrated connection circuit according to claim 1, wherein said switch and said outlet connect to said internal distribution receptacle with male pins and corresponding female receptacles.

9. The junction box with an integrated connection circuit according to claim 1, wherein said switch and said outlet have different thicknesses.

10. The junction box with an integrated connection circuit according to claim 1, further includes a cover plate.

11. The junction box with an integrated connection circuit according to claim 10, wherein said cover plate is secured with magnetic attraction.

12. The junction box with an integrated connection circuit according to claim 1, wherein said internal distribution receptacle has two independent circuits with a common ground.

* * * * *